WHEEL DISKS AND DISK WHEEL ASSEMBLIES

Filed Sept. 26, 1960

WHEEL DISKS AND DISK WHEEL ASSEMBLIES

Filed Sept. 26, 1960

10 Sheets-Sheet 3

Aug. 4, 1964 W. W. BULGRIN ETAL 3,143,377

WHEEL DISKS AND DISK WHEEL ASSEMBLIES

Filed Sept. 26, 1960

10 Sheets-Sheet 6

Aug. 4, 1964 W. W. BULGRIN ETAL 3,143,377

WHEEL DISKS AND DISK WHEEL ASSEMBLIES

Filed Sept. 26, 1960

10 Sheets-Sheet 9

3,143,377

WHEEL DISKS AND DISK WHEEL ASSEMBLIES

Walter W. Bulgrin and Meredith Hall MacKusick, Akron, Ohio, assignors to The Firestone Tire & Rubber Company, Akron, Ohio, a corporation of Ohio Filed Sept. 26, 1960, Ser. No. 58,578
6 Claims. (Cl. 301—63)

The invention relates to an improved continuous operation for producing disk wheels of conventional shape and cross section having optimum physical characteristics, and more particularly to the improved wheel disk and disk wheel assembly product of this improved process.

Conventional disk wheels for automotive vehicles are generally bowl-shaped with a flat hub portion and a curved intermediate portion terminating in a cylindrical rim flange, and usually having an annular shoulder or nave therein. The cross sectional thickness tapers from the hub out to a relatively thin rim flange. The thin rim flange reduces weight at the periphery of the wheel while still providing adequate resiliency and impact strength. Hand holes are formed in the curved intermediate portion to provide spoke portions and further reduce weight and increase resiliency and to provide access for inflating dual wheels.

Various methods have been practiced for producing such disk wheels, including a series of die-forming operations, a combination of extruding and die-forming operations, and a combination of hot or cold rolling a flat blank to taper it and then die-forming. In all of such methods of which we are aware, the metal is improperly stressed or inadequately worked to produce optimum physical characteristics in the final product.

The present invention contemplates making the disk wheel by cold spinning the curved bowl of tapering thickness from a flat blank without improperly stressing the metal, to obtain optimum physical characteristics requiring a minimum of die-forming to shape the disk into final form.

Certain prior attempts have been made to produce disk wheels by spinning, but in such cases the wheel was unduly stressed radially by the spinning operation itself or by forming operations before or after the spinning operation in order to produce the desired curved bowl shape of tapering thickness.

It is an object of the present invention to provide an improved method and apparatus for producing a disk wheel from a flat blank by spinning and die-forming operations which do not unduly stress the metal.

A further object is to produce an improved wheel disk of curved bowl shape with tapering thickness having optimum physical characteristics.

A still further object is to produce an improved wheel disk and rim assembly.

These and ancillary objects are accomplished by the improved methods, apparatus and articles disclosed herein, preferred embodiments of which are shown by way of example in the accompanying drawings and described in detail herein. Various modifications and changes in details of construction are comprehended within the scope of the invention defined in the appended claims.

In carrying out the invention, a flat circular disk is blanked, edge-machined, and then spun on a mandrel in such manner as to form curved bowl shape of tapering thickness by progressively displacing elements of the metal axially on a curved mandrel while maintaining the outer diameter of the disk constant, then die-forming the bowl into finished shape without unduly stressing the intermediate curved portion thereof, piercing the hand holes and hub bolt holes in the formed disk, press fitting the formed disk into a rim, and finally circumferentially welding the rim to the disk.

Figure 3:
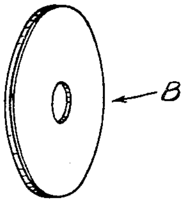
FIG. 3 is a perspective view representing the blank after machining its outer edge.
Figure 4:
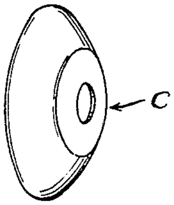
FIG. 4 is a perspective view of the spun bowl.
Figure 5:
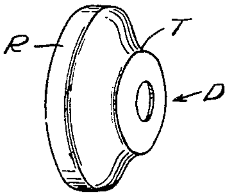
FIG. 5 is a perspective view of the bowl die-formed into finished shape.
Figures 6, 7:
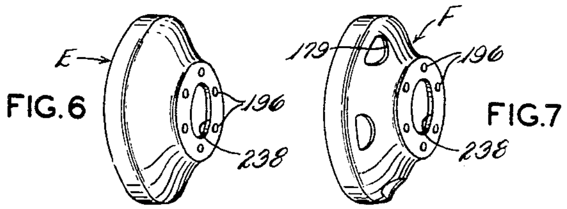
FIG. 6 is a perspective view of the formed bowl after piercing bolt holes in the hub portion.
FIG. 7 is a perspective view of the formed bowl after piercing hand holes in the intermediate portion.

In making a disk wheel having the conventional shape with tapering thickness shown in perspective in FIGS. 5–7 and in cross section in FIGS. 19–22, the wheels are spun from the flat circular edge-machined disk B shown in FIG. 3 to the intermediate bowl shape C of FIG. 4 (shown in cross section in FIG. 13), and then die-formed to the finished shape D of FIG. 5 (shown in cross section in FIG. 14), followed by hole piercing, coining and machining operations. Detailed disclosure of assembly-line apparatus for performing certain preliminary and intermediate operations of the present process is set forth in copending W. W. Bulgrin et al. U.S. application Serial No. 58,582, filed September 26, 1960, and assigned to the assignee of the present application, to which reference is made for disclosure of such other and further particulars as may be necessary to instruct one skilled in the art in the practice of the present invention.

Figure 2:
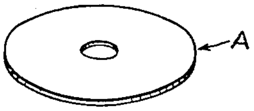
FIG. 2 is a perspective of the flat circular blank from which the bowl portion of the wheel is formed.
Figures 12, 13:
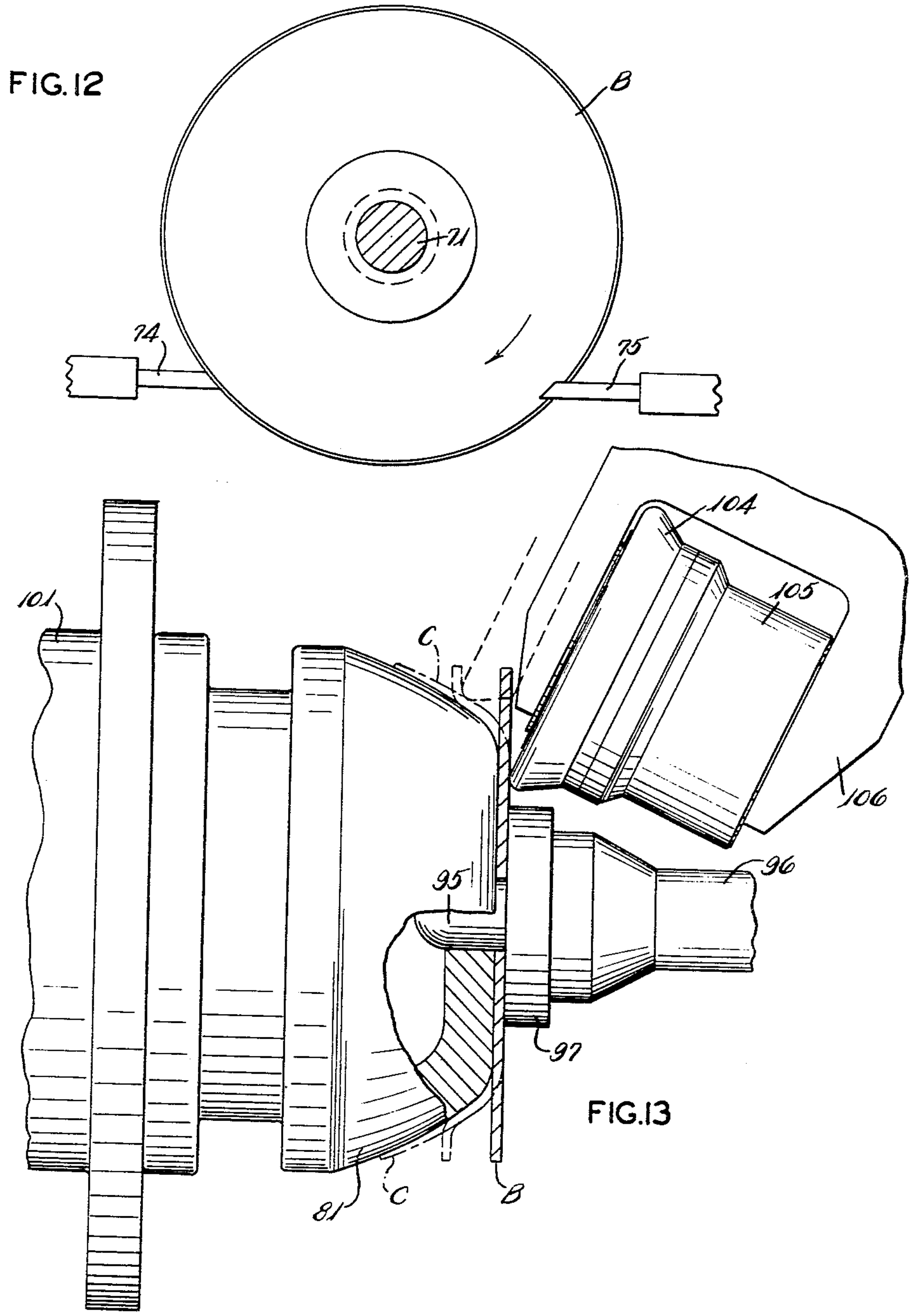
FIG. 12 is an enlarged schematic view showing the edge-turning and chamfering operations.
FIG. 13 is an enlarged elevational view, partly in section, showing the improved spinning operation.

The aforementioned copending application discloses details of methods and means for blanking and piercing blank A of FIG. 2 from flat sheets or plates in a hydraulic press and for trimming and chamfering blank B of FIG. 3, as illustrated schematically in FIG. 12. These or other suitable preliminary operations may be performed to provide a suitable blank B for the spinning operation and subsequent operations hereinafter described.

*The Spinning Operation*

Figure 10:
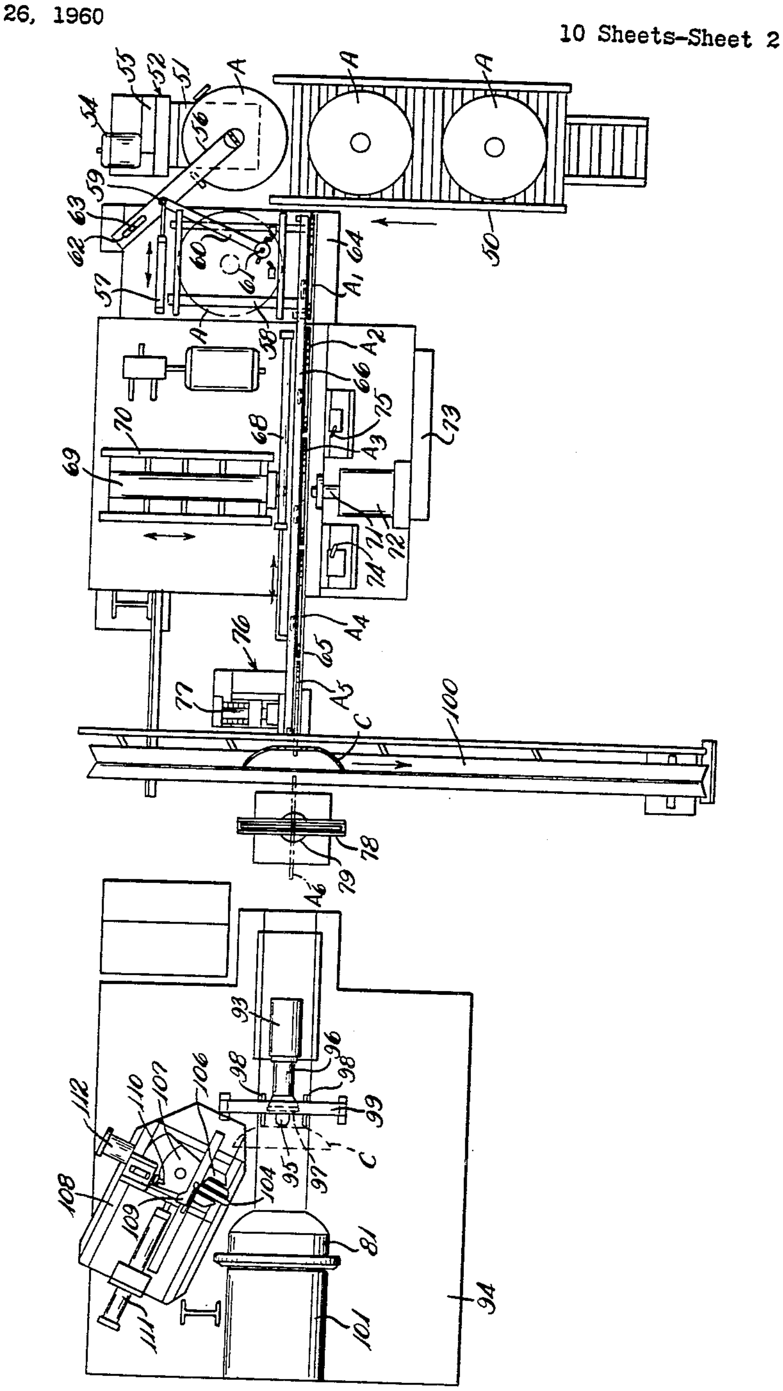
FIG. 10 is a schematic plan view of the improved spinning apparatus.
Figure 11:
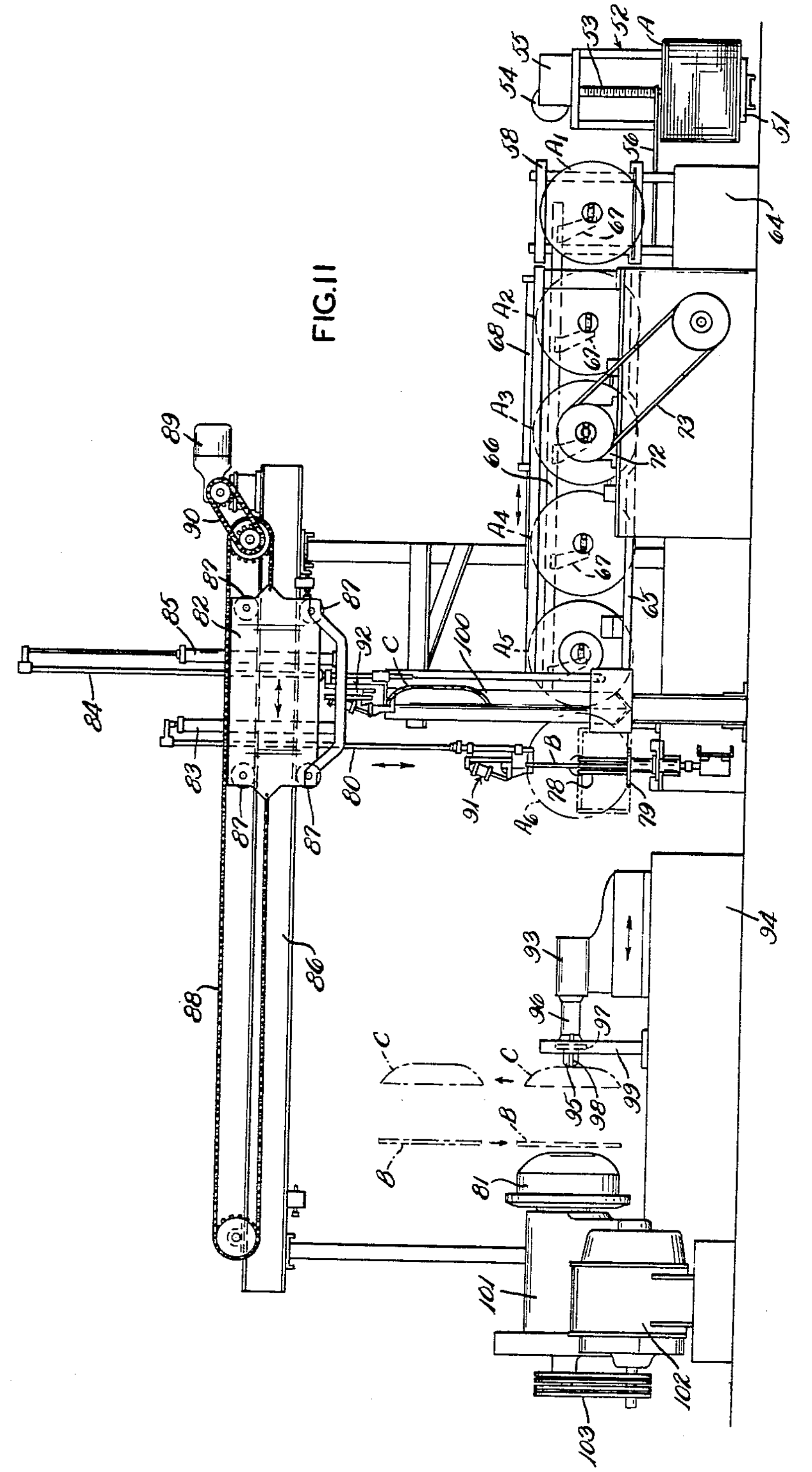
FIG. 11 is a front elevation thereof.

Referring to FIGS. 10 and 11, stacks of the blanks A are conveyed or taken to a feeder conveyor 50 which feeds the stacks successively onto the table 51 of a stack lifter 52. The table 51 is raised and lowered by a vertical screw 53 which is driven by a motor 54 through a gear box 55.

The height to which the stack is raised is determined by a limit switch (not shown) which contacts the top blank A on the stack, and a transfer arm 56 has a finger at its outer end which engages in the hub hole of the top blank only. A hydraulic cylinder 57 actuates the transfer arm 56 to slide a top blank A from the stack onto a swinging lift rack 58 when the rack is in the horizontal position shown in FIG. 10.

The transfer arm 56 is connected by a floating pivot 59 to one end of an arm 60, the other end of which is pivoted at 61 on the base of the machine. The outer end of transfer arm 56 has a slot 62 engaging a stationary pin 63 on the machine. This arrangement provides for transferring the top blank A from the stack in a straight line longitudinally of the machine onto the rack 58.

The rack 58 is pivoted at its inner end on a base 64 for swinging from a horizontal to a vertical position and may be actuated by any suitable means (not shown). The swinging movement of the rack 58 is suitably coordinated with that of the transfer arm 56 so that when a blank is placed on the rack the arm returns to pick up another blank from the stack, and the rack swings to the vertical position of FIG. 11.

When the rack 58 is in vertical position, the blank A thereon is aligned with a longitudinal track 65 adapted to guide a series of blanks longitudinally of the machine. A traveling arm 66 extends alongside of the track and has a plurality of depending arms 67 having fingers at their lower ends adapted to engage the hub holes of blanks on the track 65. The finger on the rearmost arm 67 is adapted to engage in the blank A supported on the rack 58 in vertical position.

The traveling arm 66 is reciprocated by a hydraulic cylinder 68 controlled by suitable controls such as limit switches, not shown. As the arm 66 is reciprocated, the blanks A are advanced longitudinally along the track 65 step-by-step to the various stations or positions $A_1$–$A_6$ shown in FIG. 11, and when a blank A is advanced from the rack 58 onto the track 65, the rack swings back to horizontal position to receive the next successive blank from the transfer arm 56.

When a blank reaches the station $A_3$, the outer edge surface thereof is machined and one corner is chamfered. At this station is a tailstock 69 movable on a transverse slide 70 and having a nose which is inserted through the hub hole of the blank, and displacing the blank so that the nose fits in the spring-loaded spindle 71 of the headstock 72. With the blank in this position, the spindle is then rotated by a drive belt indicated at 73, and the blank is engaged by a turning tool 74 on one side and by a diametrically opposite chamfering tool 75 (see FIG. 15). The turned and chamfered disk is designated "B" in FIGS. 3 and 12.

The disk B is then advanced along the track 65 to the positions $A_4$ and $A_5$ successively. At the position $A_5$ a suitable lubricant is applied to one surface of the disk to prepare it for the spinning operation. This lubricant may be applied by a device idicated generally at 76 which has a spindle 77 for rotating the disk while pressing a bar of tallow or the like against the surface of the disk.

When each disk B reaches station $A_6$ it enters a rack 78 supported on a turntable 79, the aligned position of the rack being indicated in phantom in FIG. 11. The turntable is then rotated 90° to the full line position shown in FIGS. 10 and 11 so that the disk B is positioned transversely of the machine. In this position, the disk B is adapted to be picked up by an overhead traveling arm indicated at 80 in FIG. 11 and carried forward to the spinning mandrel 81.

The lifting arm 80 is mounted on a carriage 82 and is raised or lowered by a hydraulic cylinder 83 on said carriage. A second lifting arm 84 is similarly mounted on said carriage to the rear of arm 80 and is adapted to be raised and lowered by hydraulic cylinder 85 on said carriage. The carriage 82 is movable along a longitudinal beam 86 by means of rollers 87 rolling on the top and bottom of the beam. The carriage is attached to a drive chains 88 which is driven by a motor 89 and chain 90 for reciprocating the carriage back and forth on the beam 86.

Each of the arms 80 and 84 have at their lower ends toggle clamps indicated generally at 91 and 92, respectively, having clamping jaws which preferably are operated by compressed air cylinders. The front clamp 91 is adapted to pick up and advance the disks B while the rear clamp 92 is adapted to pick up and return the spun bowls C from the spinning operation. When the front arm 80 has positioned a disk B facing the mandrel 81, the tailstock 93 is slid forwardly on the base 94 to engage the nose 95 of the floating spindle 96 of the tailstock in the hub hole of the disk, and as the nose enters the mandrel (FIG. 13) the clamp 91 releases the disk and arm 80 is raised. The spindle 96 has a magnetic stop plate 97 at the base of the nose 95 so that when the tailstock is retracted at the end of the spinning operation, the spun bowl C will be stripped from the mandrel 81. When the tailstock 93 is retracted to the position of FIGS. 10 and 11, the bowl C is stripped from the nose 95 by diametrically opposite stripper pins 98 mounted in a frame 99 on the tailstock base 94.

Just before the bowl is stripped from the nose 95, the rear lifting arm 84 is lowered and the clamp 92 clamps the bowl, and then when the bowl has been stripped from the nose the arm raises the bowl to the upper position indicated in FIG. 11 and the carriage is retracted to position the bowl over an inclined discharge chute 100, as indicated in full lines in FIGS. 10 and 11. The clamp 92 then releases the bowl C into the chute and the front arm 80 descends with its clamping jaws open to pick up the next disk B, whereupon the carriage again moves forward and the operation is repeated.

The spinning mandrel 81 is rotatably mounted on a headstock 101 and is driven by a motor 102 through a belt drive 103. The spinning tool or tool ring 104 is journaled in a bearing housing 105 (FIG. 13) in a yoke 106, and the yoke is carried on a cross slide 107 (FIG. 10) movable at right angles to the main slide 108 which is angularly movable on the base 94 at an angle to the axis of the headstock 101. Thus the tool ring 104 can be moved in two directions to follow the contour of the spinning mandrel 81, and the movement of the tool ring is controlled by a template 109 of proper contour, supported on the main slide and engaged by a tracer finger 110 on the cross slide. The main slide may be operated by a suitable hydraulic ram 111, and the cross slide may be operated by a suitable hydraulic ram 112.

By using suitable and well-known controls such as limit switches actuating solenoid valves controlling the operation of fluid cylinder means for the various mechanisms, the entire operation from the stack lifter for the blanks A to dropping the spun bowls C into the discharge chute 100 is carried out automatically.

During the spinning operation, as the tool ring 104 is moved to follow the contour of the spinning mandrel 81, each circumferential element of the disk is displaced axially, but not radially, of the mandrel as the tool moves along the mandrel so that the outer diameter of the disk is maintained constant at all times and the outer diameter of the finished bowl is accordingly the same as that of the original disk. The contour of the spinning mandrel is such that as the circumferential elements of the disk are successively displaced axially the thickness of the disk is gradually tapered to compensate for the axial displacement and maintain the constant outer diameter. The intermediate portion of the disk may be arcuate or a parabolic curve, and the thickness tapers in proportion to the sine of the angle formed by the tangent at any point on said curve with respect to the axis of the finished bowl; or, stated another way, the thickness tapers in accordance with the progressive change in the sine of the angle formed between the tangent to said curved portion and its axis. For example, the thickness at the hub portion may be approximately 2.5 times that of the thickness at the outer edge. Thus, the hub portion may be 0.375" thick and the outer edge 0.156" thick.

Accordingly, the spinning operation performs a cold working of the metal without improperly stressing it, so that optimum physical characteristics are obtained resulting in maximum strength and resiliency in the finished product. Because of the optimum physical characteristics produced by the improved spinning operation, it is not necessary to hot or cold work the disk prior to the spinning operation; nor is it necessary to subsequently treat the metal to relieve stresses therein.

Moreover, due to the curved path followed by the tool ring, the wear on the spinning nose is distributed over its curved surface. Obviously, by providing a symmetrical nose medially of the tool ring, additional tool life can be obtained by reversing the ring.

*The Die-Forming Operation*

Figure 14:
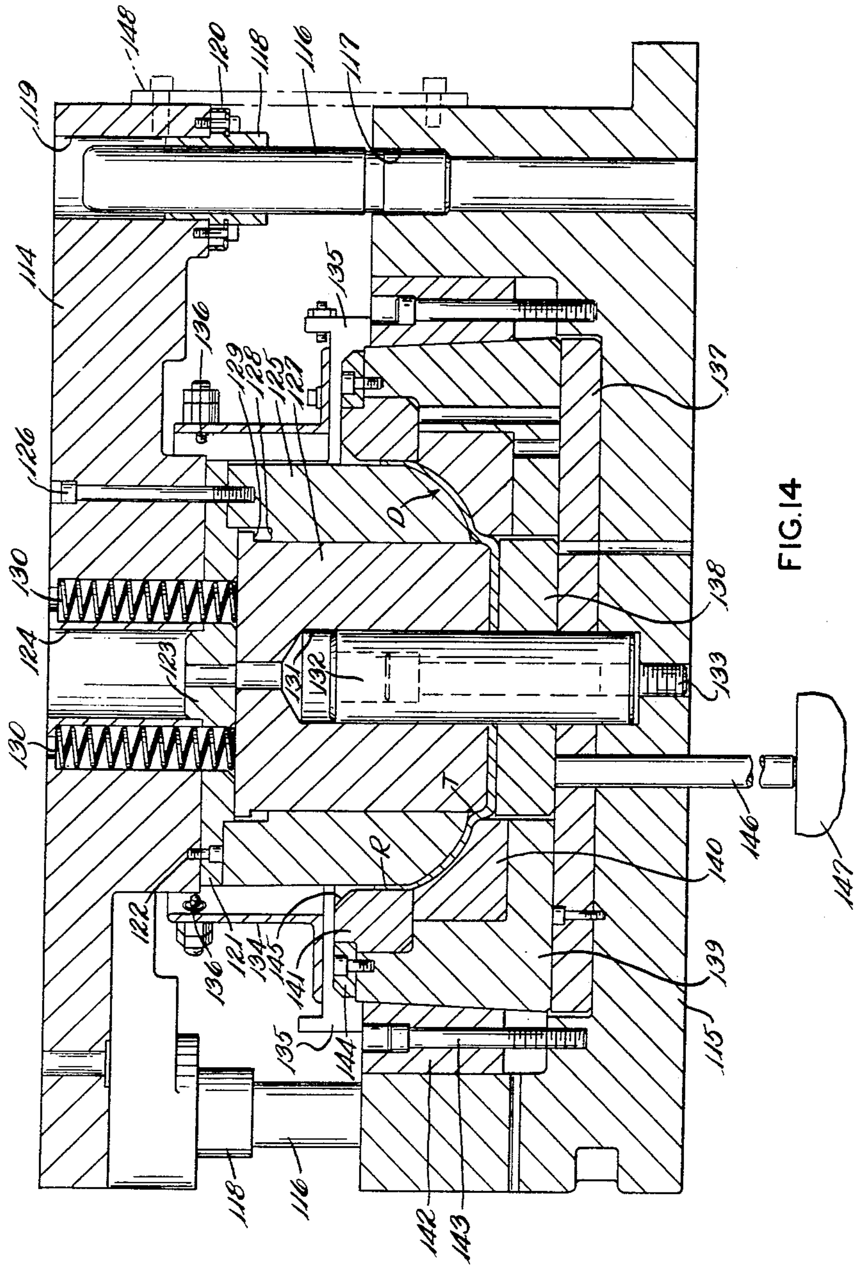
FIG. 14 is a cross sectional view showing the improved forming and restriking operation.

The spun bowls C are taken from the discharge chute 100 to a press of conventional construction in which are mounted the forming dies shown in FIG. 14. Attached to the ram of the press in the usual manner is the punch holder 114, and the die shoe 115 is supported on the bed or table of the press. Guide pins 116 are press-fitted into bores 117 in the die shoe, and are slidably received in bushings 118 secured in bores 119 in the punch holder by retainer rings 120.

A punch backing plate 121 is secured to the under surface of the punch holder by screws 122, and is provided with a centering boss 123 received in a bore 124 in the punch holder. A forming punch ring 125 is held against the backing plate 121 by screws 126 and a hub face restrike punch 127 is slidably mounted in the punch ring 125. Annular shoulders 128 and 129 on the punch ring and hub face restrike punch, respectively, limit the relative motion therebetween. Springs 130 located in the punch holder 114 and extending through the backing plate 121 yieldingly urge the hub face restrike punch 127 downwardly.

The hub face restrike punch has an axial bore 131 which slides over an axial centering plug 132 adapted to fit the hub holes in the bowls C and secured in the die shoe 115 by a screw stud 133. Surrounding the punch ring 125 is an annular flange stock guide 134 supported on the die shoe by brackets 135 and having circumferentially arranged spring centering pins 136 to center a spun bowl C when it is placed in the guide 134 before the ram and punch holder descend.

The female forming die is supported on a backing plate 137 seated in the die shoe, and comprises a hardened central die pad 138 through which the centering plug 132 extends. Surrounding the die pad is a cup-shaped die retaining ring 139 which encloses and supports a contour die ring 140 and a die ring 141 for forming the rim flange on the bowl. The outer annular surface of the retaining ring 139 is slightly tapered and is wedgeably held in position by a wedge ring 142 secured to the die shoe by screws 143. A clamping ring 144 holds the die ring 141 in place against the upper surface of the contour ring 140.

In the operation of the forming dies, as the punch descends and enters the bowl C positioned within the guide ring 134, the springs 130 cause the hub face restrike punch 127 to yieldingly engage the hub portion of the bowl before the punch ring 125 engages the curved rim of the bowl. When the hub portion bottoms, the punch ring 125 then draws the curved portion of the bowl against the contour die 140, and in order to prevent wrinkling or buckling of the rim portion of the bowl during this operation an annular beveled surface 145 is provided to substantially conform to the angle of the outer rim of the bowl C and allow the metal to be drawn gradually and smoothly into the flange rim R of the formed bowl D (FIG. 5).

As seen in FIG. 14, the contour ring 140 cooperates with the punch ring 125 to form the annular shoulder T in the formed bowl between the flat hub portion and the intermediate curved portion. The gradually tapering thickness from the hub portion to the outer rim of the bowl is substantially maintained in the forming dies, although a slight thinning of the rim flange R may be accomplished.

The shock of the hub face restrike punch bottoming on the hub portion of the bowl is preferably cushioned by means of pins 146 supporting the die pad 138 and extending through the die shoe to contact a cushion plate 147 cushioned by compressed air in the base of the press.

As the punch holder 114 is raised after the forming operation, the interengaging flanges 128 and 129 of the restrike punch and contour die ring cause the restrike punch to strip the rim flange R of the bowl from the outer punch ring 125. As the punch holder continues to rise, the air cushion pins 146 will raise the formed bowl out of the forming dies 140 and 141. A tie strap 148 may be provided to fasten the dies together when stored.

Figure 1:
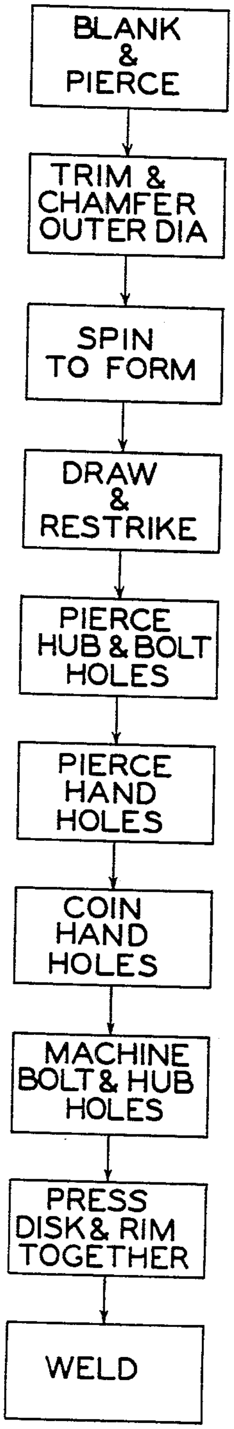
FIG. 1 is a block diagram showing the sequence of the principal operations in making disk wheels according to the present invention.

As shown in FIGS. 1, 6 and 7, following the drawing and restriking operations described above, suitable methods and means are employed to pierce, coin and machine hub holes, bolt holes and hand holes in the wheel disk D. For example, the methods and apparatus disclosed in the aforementioned copending U.S. application Serial No. 58,582 may be employed.

*Assembling the Disk and Rim*

Figure 15:
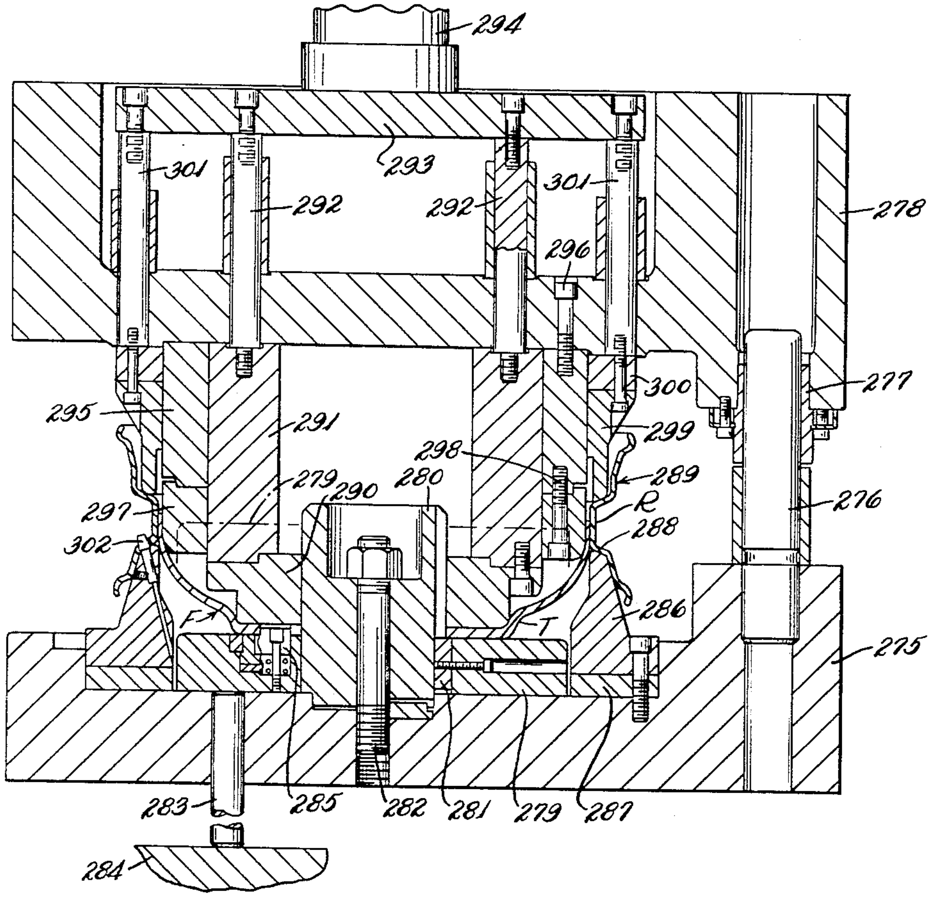
FIG. 15 is a cross sectional view showing the operation of pressing the bowl into one type of rim.
Figure 16:
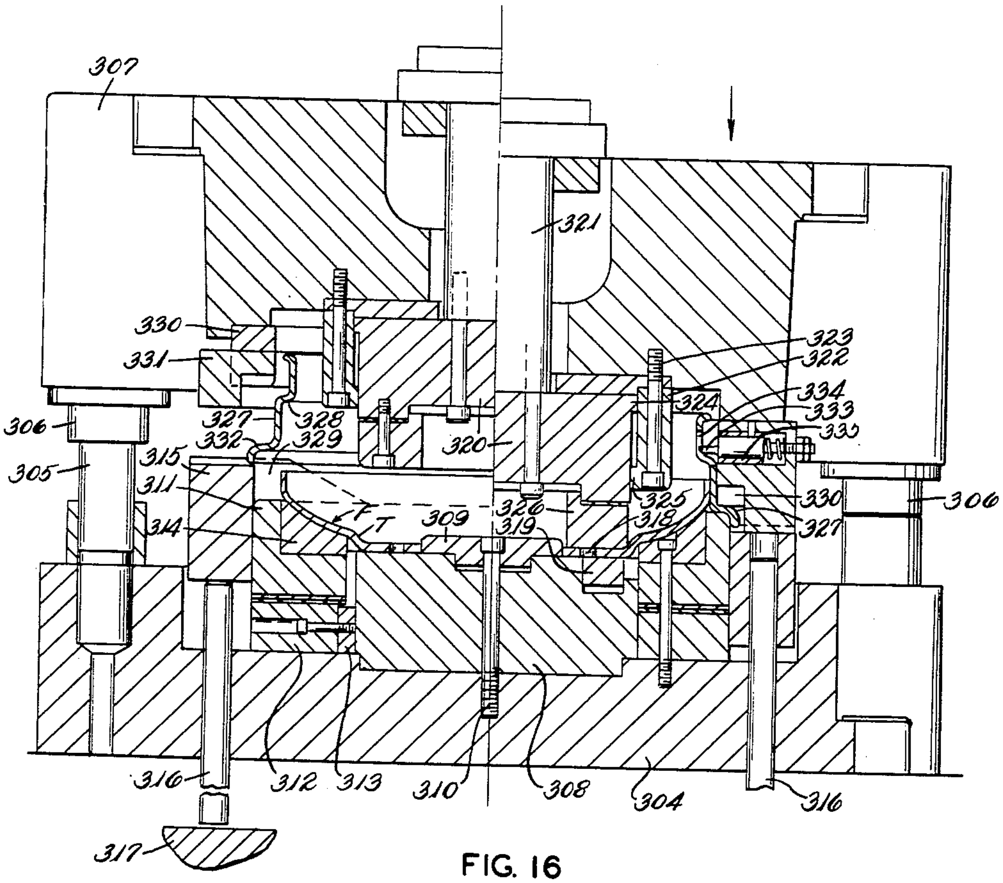
FIG. 16 is a similar view showing the operation of pressing a different type of rim onto the bowl.

After the hand holes have been pierced and coined, and after such machining of the bolt and hub holes as may be required, the bowls F are pressed into metal rims of conventional construction in preparation for being welded together. The dies for pressing the wheel into a conventional drop center rim used for a tubeless tire are shown in FIG. 15. A similar operation is carried out for assembling the wheels in flat base rims. Certain types of rims having an annular offset portion require dies such as shown in FIG. 16 for pressing the rim onto the disk rather than pressing the disk into the rim as in FIG. 15.

Referring to FIG. 15, the lower die shoe 275 is supported on the bed of the press and has guide pins 276 therein which are slidable in a usual manner in bushings 277 in the punch holder 278. A die pad 279 is supported on the die shoe and pilot shaft 280 is non-rotatably secured in the pad 279 by a key 281 and held on the die shoe 275 by a bolt 282. Pins 283 extend through the die shoe 275 and are supported by a fluid cushion member 284 in the lower part of the press, and these pins act to raise the pad 279 to a loading position, indicated in phantom, when the press ram is raised.

A locator finger 285 is mounted in the pad 279 for centering one of the bolt holes in the bowl F to hold the bowl against rotation. Surrounding the pad 279 is a die ring 286 mounted on a backing plate 287, and the upper rim of the die ring is adapted to engage and support the shoulder 288 on one side of the drop center portion of the rim 289.

The pressure plate 290 of the punch is provided with a rounded nose for centering within the shoulder portion T of the wheel to positively hold the wheel in alignment as the pressure plate bottoms on the hub portion of the bowl. The pressure plate 290 is secured to a filler or adaptor ring 291 which abuts the lower surface of the punch holder 278 and is supported by stripper pins 292 connected at their upper ends to a stripper plate 293 attached to an air cushioned ram 294 within the press ram.

Surrounding the filler ring 291 is a pressure ring adaptor 295 secured to the punch holder by screws 296, and a rim flange pressure ring 297 is attached to the bottom of the adaptor ring 295 by screws 298. The pressure ring 297 is adapted to fit within the rim flange R of the bowl to hold the same in alignment as it is pressed into the drop center portion of the rim. A leveling punch ring 299 surrounds the pressure ring adaptor 295 and abuts a backing ring 300. The punch ring 299 and its backing ring 300 are secured to stripper pins 301 which extend through the punch holder 278 and are secured at their upper ends to the stripper plate 293.

In operation, when the ram is in raised position the rim 289 is placed on the die ring 286 in the position shown and a locator pin 302 is preferably engaged in the valve hole of the ring to locate the rim radially with respect to the disk. A bowl F is then dropped within the rim, and is centered over the top of the pilot 280 and rests on the pad 279 in its upper position shown in phantom. As the ram descends, the leveling punch ring 299, held in advance position by the stripper plate, engages the upper shoulder formed by the drop center portion of the rim and seats the rim on the die ring 286. Next, the pressure plate 290 bottoms on the flat hub portion of the bowl, and then the punch holder forces the pressure ring 297 within the rim flange R of the bowl and presses it within the inner surface of the drop center portion of the rim to the position shown in FIG. 15.

When the ram of the press is raised, the stripper plate 293, acting through stripper pins 292 and 301, holds the rim and wheel assembly down until the pressure ring 297 is stripped from the rim flange R, whereupon further upward movement of the ram strips the pressure plate 290 from the bowl F, and then raises the pressure plate and leveling punch ring 299 to allow the lower pressure pad 279 to rise and strip the assembly from the lower die ring 286.

Accordingly, the rim 289 is positively held in alignment at both the top and bottom thereof during the pressing operation, and at the same time the disk is independently held in positive alignment at its hub portion and at its rim flange.

Referring to FIG. 16, the lower die shoe 304 is supported on the bed of the press in a usual manner and has the usual guide pins 305 slidably engaged in the bushings 306 in the punch holder 307. The lower die pad 308 is supported on the die shoe 304 and has a centering pad 309 in its upper surface for engaging the hub hole of a bowl F resting on the pad 308. The centering pad is secured to the die shoe by a jack screw 310. Surrounding the pad 308 is a rim leveling ring 311 supported on a backing plate 312 splined to the pad by a key 313. A positioning die ring 314 is mounted in the retainer ring 311 and conforms to the intermediate curved portion of the bowl F. Surrounding the retainer ring 311 is a rim supporting ring 315 which is carried on cushioning pins 316 extending through the die shoe to a cushioning support 317 in the press. A locator pin 318 is mounted on a block 319 in the pad 308 for entering a bolt hole in the hub portion of the bowl F to hold the same against rotation. The left half of FIG. 16 shows the punch holder 307 raised to start the pressing operation, and the right half shows the punch holder 307 at the bottom of its stroke at the finish of the pressing operation.

The punch 320 is carried in the punch holder 307 on a shaft 321 which is connected to a ram cushion member in the ram, and the punch is slidable within a retainer ring 322 secured to the punch holder by screws 323, the relative movement of the punch being limited by shoulders 324 and 325 on the punch and retainer ring, respectively. A pressure ring 326 is secured to the bottom of the punch, and has a rounded nose which is adapted to fit within the shoulder T of the bowl F when the punch bottoms, to hold the bowl in positive alignment.

In operation, the bowl F is placed in position on the pad 308 and positioning die ring 314, and the rim 327 with an inwardly offset portion 328 is centered on the top surface of diametrically opposed arms 329 extending inwardly from the rim support ring 315. The rim is positioned radially with respect to the disk by allowing pin 333 to engage valve slot 334. The pin 333 is carried in a block 335 mounted in a notch in the pressure ring 330. As the punch holder 307 is lowered, a rim pressure ring 330 supported on outer rim guide blocks 331 seats on the shoulder 332 of the rim and pushes the rim downwardly against the cushioning pressure of pins 316 to telescope the rim 327 over the rim flange of the bowl and seat the underside of rim shoulder 332 on the upper surface of the rim leveling ring 311.

When the punch holder 307 is raised, the supporting ring 315 urged upwardly by pins 316 engages the bottom edge of the rim and lifts the assembly off the leveling ring, and when the assembly reaches the position shown in the left half of FIG. 16, the pressure ring 326 urged by the ram cushion strips the ring 330 and blocks 331 from the rim.

*The Welding Operation*

Figure 8:
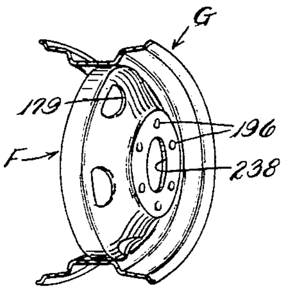
FIG. 8 is a perspective view showing the finished bowl pressed into a rim.
Figure 17:
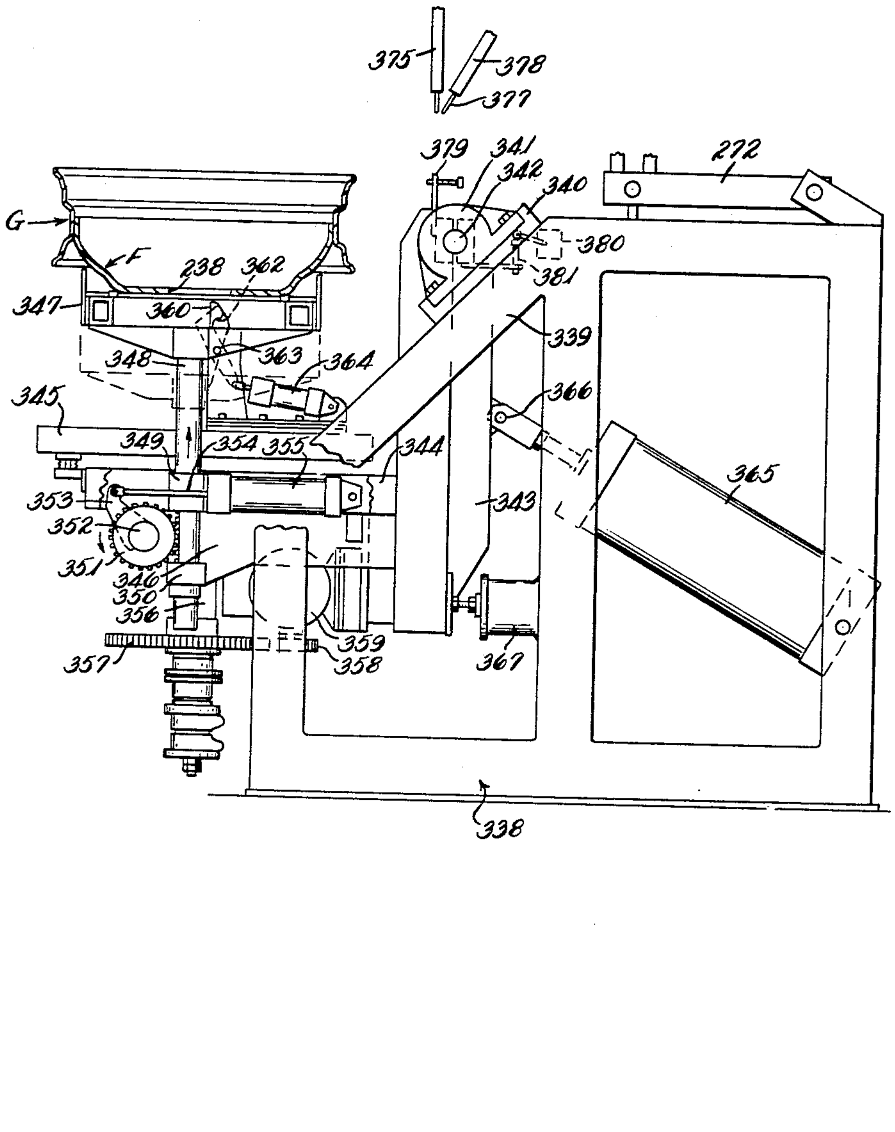
FIG. 17 is an elevational view of the welding apparatus for welding the bowl to the rim, showing the supporting table in position to receive the bowl and rim assembly after the pressing operation of FIG. 15 or FIG. 16.
Figure 18:
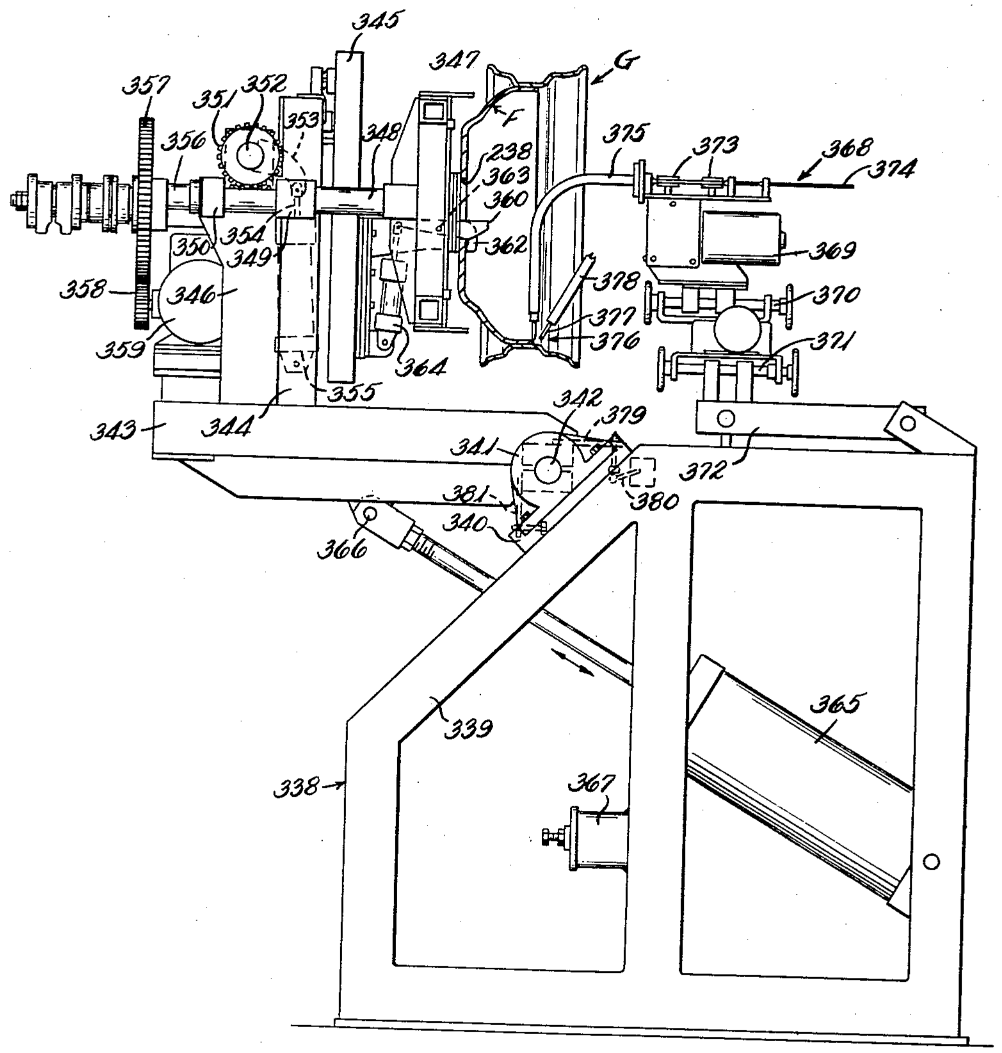
FIG. 18 is a similar view showing the table assembly swung upwardly to bring the assembly into welding position for the welding torch.

The assembly of the wheel and disk from the pressing operation shown in FIG. 15, for example, is indicated as a whole at G in FIGS. 8, 17 and 18. From the pressing operation the assemblies G may be conveyed by suitable means (not shown) to the welding apparatus shown in FIGS. 17 and 18.

The welding apparatus preferably comprises a frame, indicated generally at 338, having an inclined portion 339 on which brackets 340 are secured, and bearings 341 are mounted in the brackets and journal a trunnion shaft 342. A table frame 343 is pivoted on the trunnion shaft 342 and is adapted to lie in a vertical position, as shown in FIG. 17, when the apparatus is in position to receive or unload an assembly G. Frame members 344 extend outwardly at right angles to the frame 343 and support a face plate 345 in parallel relation to the frame members 344. Other frame members 346 extend parallel to the frame members 344 for a purpose to be described.

A table 347 is movably mounted on rack shafts 348 slidable in bearings 349 and 350 on the frame members 344 and 346, respectively, and the shafts 348 have gear rack sections meshing with gear wheels 351 on a rocker shaft 352 journaled at its ends in the outer portions of the frame members 346. The rocker shaft has an arm 353 thereon pivotally connected to the piston rod 354 of a fluid cylinder 355 mounted on one of the frame members 344. Accordingly, actuation of the piston rod 354 will reciprocate the rack shafts 348 and raise and lower the table 347, the lowered position being shown in phantom in FIG. 17 and in full lines in FIG. 18.

Between the rack shafts 348 is a drive shaft 356 journaled in suitable bearings (not shown) on the frame members 344 and 346, and the upper end of the shaft, as viewed in FIG. 17, is slidably keyed in the table 347. A drive gear 357 mounted on the shaft 356 is driven by gearing 358 from a motor 359 supported on the frame 343.

A beveled locator finger 360 (best shown in FIG. 18) is mounted on the table 347 and is adapted to enter the hub hole 238 of the wheel F of the assembly G to center the assembly when the table is lowered. A clamping finger 362 is pivoted on the table at 363, and is adapted to enter and engage the edge of hub hole 238 when the table is lowered to clamp the assembly to the table for rotation therewith. A fluid cylinder 364 is mounted on the face plate 345 and its piston rod is pivotally connected to the opposite end of finger 362 for moving it into and out of clamping position.

A fluid cylinder 365 is mounted on the frame 338, and its piston rod is pivotally connected at 366 to the table frame 343 for swinging the table assembly bodily from the position of FIG. 17 to the position of FIG. 18 about the trunnion shaft 342 as a center. When the table is returned to the position of FIG. 17, it abuts an adjustable table stop 367 on the frame 338. In the raised position of the table shown in FIG. 18, the drive shaft 356 is horizontal and rotates the assembly G on a horizontal axis. In this position, the welding apparatus indicated as a whole at 368 in FIG. 18 is in proper relative position to weld the rim flange of the wheel F to the rim. The welding apparatus preferably comprises a welding head 369 adjustably mounted by adjusting shafts 370 and 371 on a frame member 372 which is vertically adjustably mounted on the frame 338.

The welding head 369 has feed roll means 373 for feeding the weld rod 374 through a curved conduit 375 to the torch zone indicated at 376. A tube 378 is directed into the torch zone which supplies inert gas to shield the welding arc.

In the operation of the welding apparatus, when an assembly G is placed on the table 347, the fluid cylinder 355 is activated to swing the arm 353 clockwise, as viewed in FIG. 17, and cause the rack shafts 348 to lower the table. When the clamping finger 362 enters the hub hole 238, the fluid cylinder 364 may be activated (by a limit switch on the rocker shaft 352, for example) to cause the finger 362 to clamp the hub portion of the wheel F. The lift cylinder 365 is then activated to swing the table assembly to the position of FIG. 18, placing the rim portion of wheel F in welding relation to the torch 376. When the table reaches this position, an arm 379 secured on the trunnion shaft 342 actuates a limit switch 380 on the frame 338, and the limit switch is electrically connected to the drive motor 359 and to the welding circuit, so that the torch is lighted and the wheel assembly starts to rotate simultaneously. When the assembly has rotated through a full revolution, a cyclic timer shuts off the torch and the drive motor 359 and deactivates the lift cylinder 365 to lower the table. When the table assembly reaches bottom against the stop 367, an arm 381 secured on the trunnion shaft 342 reverses the limit switch 380, causing the clamping finger 362 to disengage, and the rack shafts 348 to raise the table to the position of FIG. 17 to unload the welded assembly therefrom.

Figure 9:
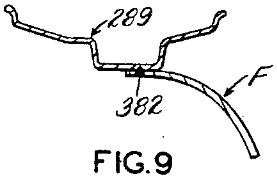
FIG. 9 is an enlarged fragmentary sectional view showing the bowl and rim welded together.
Figure 19:
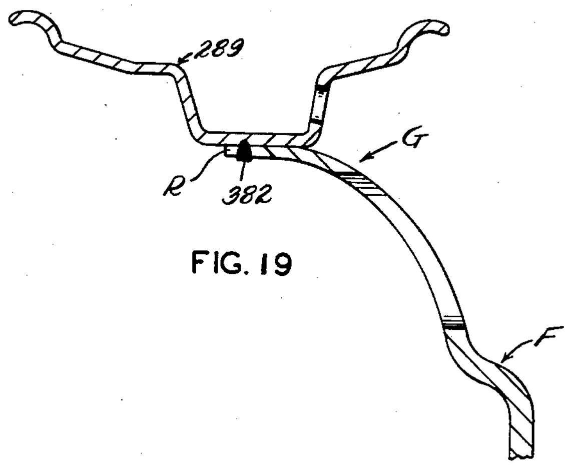
FIGS. 19 and 20 are fragmentary sectional views showing a burn-through type of weld applied to different types of assemblies.

A preferred type of weld, which may be described as a "burn through weld," is shown in FIGS. 9 and 19 and may be accomplished by the foregoing operation. In this type of weld the torch is set to burn through the flange R of the bowl F and part way into the drop center portion of the rim 289. The weldment 382 is a continuous circumferential weldment spaced a substantial distance from the edge of the flange, so that it acts as a barrier to prevent elongation of any cracks starting in the edge of bowl flange R. This type of weld affords a maximum strength union of the wheel flange and rim continuously around the entire circumference of the disk and rim, as distinguished from spot welding, and provides a leak-proof union for tubeless tire usage, as an advantage over the use of rivets, bolts, and the like.

Figure 20:
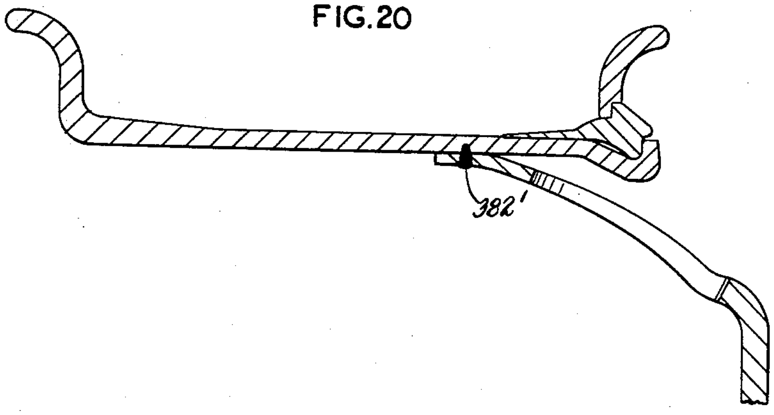

FIG. 20 shows the same type of weld at 382' in a different rim and bowl assembly.

Figures 21, 22:
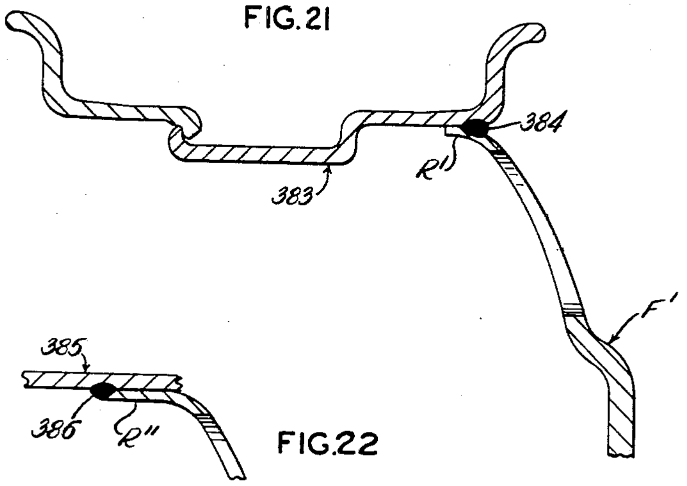
FIGS. 21 and 22 are similar views showing different types of welds applied to other types of assemblies.

FIG. 21 shows an assembly of still different styles of rim and bowl, and also a different type of continuous weld which can be carried out by the aforesaid welding operation by employing a different shape of weld rod conduit. In this case the flange R' of the bowl F' is joined to the rim 383 by a continuous circumferential weldment 384 disposed in the annular groove formed between the flange R' and the rim 383, and penetrating into the walls of both the flange and the rim. The weld rod would be conducted around the outer edge of the rim to bring the torch into the annular groove.

FIG. 22 shows that the continuous weldment may also be applied between the rim 385 and the edge of the bowl flange R'' as indicated at 386, penetrating into both the bowl flange and the rim, as an alternative form for any of the above designs of rims or other types of rims to be attached to the bowl flange.

*Résumé*

The improved methods and apparatus herein described provide a revolutionary rapid and economical continuous operation adapted for automation for producing a lightweight disk wheel having optimum physical characteristics from a flat blank, and for producing a welded disk and rim assembly having extremely high resiliency and impact strength. The number of diskwheels produced per hour by the improved operation is increased many times over conventional practice.

As a result of the improved spinning operation, a minimum amount of die-forming of the metal is required, so that the metal of the disks is not unduly stressed. The improved disk has the desired bowl shape with a curved perforate intermediate portion tapering in thickness out to a relatively thin rim flange, giving maximum strength and resiliency with minimum weight.

Also as a result of the accurate spinning and die forming of the wheel disk or bowl, the rim and wheel assembly produced thereby is found to have far greater accuracy in circumferential and diametrical size and far greater accuracy in concentricity of the tire bead seats of the rim with respect to the axis of the wheel, and far greater accuracy in the disposition of the central plane of the rim at right angles to the axis of the wheel. The accuracy of the wheel in these three respects is such that the tolerances of manufacture can be reduced from ¼ to ½ the tolerances required in prior art types of wheel and rim assembly production.

What is claimed is:

1. A metal spun wheel disk having a curved bowl shape with a flat hub portion and a cylindrical relatively thin rim flange connected by an outwardly convex parabolically curved intermediate portion and the thickness of the curved intermediate portion tapering gradually from the hub portion outwardly to the peripheral cylindrical rim flange, the thickness of said disk tapering in proportion to the sine of the angle formed by the tangent at any point on said parabolically curved intermediate portion with respect to the axis of said curved bowl shape.

2. A metal spun wheel disk having a curved bowl shape with a flat hub portion and a cylindrical relatively thin rim flange connected by an outwardly convex parabolically curved intermediate portion and the thickness of the curved intermediate portion tapering gradually from the hub portion outwardly to the peripheral cylindrical rim flange, the thickness of said disk tapering in proportion to the sine of the angle formed by the tangent at any point on said parabolically curved intermediate portion with respect to the axis of said curved bowl shape, the metal of said intermediate portion being cold worked axially and unstressed in a radial direction.

3. A disk wheel assembly comprising, a spun wheel disk having a curved bowl shape with a flat hub portion and a cylindrical relatively thin rim flange connected by an outwardly convex curved intermediate portion, a tire rim fitting around said rim flange, the thickness of the curved intermediate portion tapering gradually from the hub portion outwardly to the peripheral cylindrical rim flange, the metal of said intermediate portion being cold worked axially and unstressed in a radial direction, and said rim flange being continuously welded around its periphery to said rim, the continuous weld extending internally within the body of the metal of the respective adjacent wheel disk and tire rim portions and fusing said metallic portions together.

4. A disk wheel assembly comprising, a spun wheel disk having a curved bowl shape with a flat hub portion and a cylindrical relatively thin rim flange connected by an outwardly convex curved intermediate portion, a tire rim fitting around said rim flange, the thickness of the curved intermediate portion tapering gradually from the hub portion outwardly to the peripheral cylindrical rim flange, the thickness of said disk tapering in proportion to the sine of the angle formed by the tangent at any point on said convex curved intermediate portion with respect to the axis of said curved bowl shape, and the cylindrical relatively thin rim flange being continuously welded around its periphery to said rim by a circumferential weldment spaced from the edge of the rim flange and penetrating entirely through said rim flange and into said rim so as to fuse the body of said rim flange to the body of said tire rim.

5. A disk wheel assembly comprising, a spun wheel disk having a curved bowl shape with a flat hub portion and a cylindrical relatively thin rim flange connected by an outwardly convex curved parabolic intermediate portion, a tire rim fitting around said rim flange, the thickness of the curved intermediate portion tapering gradually from the hub portion outwardly to the peripheral cylindrical rim flange in accordance with the progressive change in the sine of the angle formed between the tangent to said curved parabolic portion and its axis with the metal of said intermediate portion being cold worked axially and unstressed in a radial direction, and said rim flange being continuously welded around its periphery to said rim by a circumferential weldment spaced from the edge of the rim flange and penetrating entirely through said rim flange and partially into said rim so as to fuse the body of said rim flange to the body of said tire rim.

6. A disk wheel assembly comprising, a spun wheel disk having a curved bowl shape with a flat hub portion and a cylindrical relatively thin rim flange connected by an outwardly convex curved intermediate portion, a tire rim fitting around said rim flange, the thickness of the curved intermediate portion tapering gradually from the hub portion outwardly to the peripheral cylindrical rim flange, the thickness of said disk tapering in proportion to the sine of the angle formed by the tangent at any point on said convex curved intermediate portion with respect to the axis of said curved bowl shape, and the cylindrical relatively thin rim flange being continuously welded around its periphery to said rim by a circumferential fusion weldment spaced inwardly from the edge of the rim flange and penetrating entirely through said rim flange into said tire rim.

References Cited in the file of this patent

UNITED STATES PATENTS

| | | |
|---|---|---|
| 413,051 | Michelin | Apr. 18, 1922 |
| 1,615,686 | Eschholz | Jan. 25, 1927 |
| 1,650,780 | Williams | Nov. 29, 1927 |
| 1,812,437 | Hunt | June 30, 1931 |
| 1,940,617 | Temple | Dec. 19, 1933 |
| 2,336,767 | Ash | Dec. 14, 1943 |
| 2,975,511 | Johnson | Mar. 21, 1961 |
| 2,983,033 | Cox | May 9, 1961 |
| 3,055,327 | Sporck | Sept. 25, 1962 |

FOREIGN PATENTS

| | | |
|---|---|---|
| 812,009 | France | Jan. 27, 1937 |
| 777,015 | Great Britain | June 12, 1957 |

UNITED STATES PATENT OFFICE
CERTIFICATE OF CORRECTION

Patent No. 3,143,377 August 4, 1964

Walter W. Bulgrin et al.

It is hereby certified that error appears in the above numbered patent requiring correction and that the said Letters Patent should read as corrected below.

Column 12, line 19, for "413,051" read -- 1,413,051 --.

Signed and sealed this 26th day of January 1965.

EAL)
test:

RNEST W. SWIDER
testing Officer

EDWARD J. BRENNER
Commissioner of Patents